United States Patent [19]

Barnett et al.

[11] 4,240,485
[45] Dec. 23, 1980

[54] NONSKID TIRE CHAIN CONNECTOR MEANS

[75] Inventors: Forest H. Barnett, 2602 N. Baltimore, Tacoma, Wash. 98407; Clarence E. Barnett, Redmond, Wash.

[73] Assignee: Forest H. Barnett, Tacoma, Wash.

[21] Appl. No.: 955,948

[22] Filed: Oct. 30, 1978

Related U.S. Application Data

[63] Continuation-in-part of Ser. No. 787,781, Apr. 15, 1977, Pat. No. 4,130,155.

[51] Int. Cl.³ .............................................. B60C 27/00
[52] U.S. Cl. .................................. 152/219; 24/68 TT; 24/73 AC; 152/221; 152/242; 403/107
[58] Field of Search .................... 152/217, 219, 213 R, 152/213 A, 221, 231, 241, 242; 254/51; 403/107, 108, 105; 32/14 D; 24/68 CT, 68 TT, 70 CT, 70 TT, 70 R, 73 CE, 73 CS, 73 AC, 206 R

[56] References Cited

U.S. PATENT DOCUMENTS

| | | | |
|---|---|---|---|
| 1,247,760 | 11/1917 | Wengraf | 152/219 X |
| 1,579,446 | 4/1926 | Hagedorn | 152/213 A |
| 2,192,226 | 3/1940 | Hill | 152/241 |
| 3,423,832 | 1/1969 | Nelson | 32/14 D X |
| 4,130,155 | 12/1978 | Barnett et al. | 152/219 X |

*Primary Examiner*—John T. Goolkasian
*Assistant Examiner*—Thomas Bokan

[57] ABSTRACT

The side connector in a nonskid tire chain of this invention improves the invention of the herein identified copending application by providing spaced apart transverse bars, one carried by a bar-receiving member having an opening therein and the other by a bar-shaped member of substantial length slidable in the slot. Such construction provides supports for detachable elastic means extending between the transverse bars and relatively yieldingly urging the bar-receiving and bar-shaped members toward retracted position. One of the spaced bars extends between the walls of the bar-receiving member and the other projects on both sides of the bar-shaped member. The detachable elastic has a longitudinal slot so that an end portion can span each of the projections of the bar carried by the bar-shaped member and the other end portion can span the bar carried by the bar-receiving member. Also, the bar-receiving member can be in the form of two spaced metal walls with the slot therebetween and carried by a tire pad of an non-skid tire chain comprising a plurality of tire pads. The ends of the slide connector includes a link and connecting pin wherein the link has a pin-receiving slot which extends arcuately inwardly and longitudinally therein providing a lock when the detachable connector is under tension.

6 Claims, 16 Drawing Figures

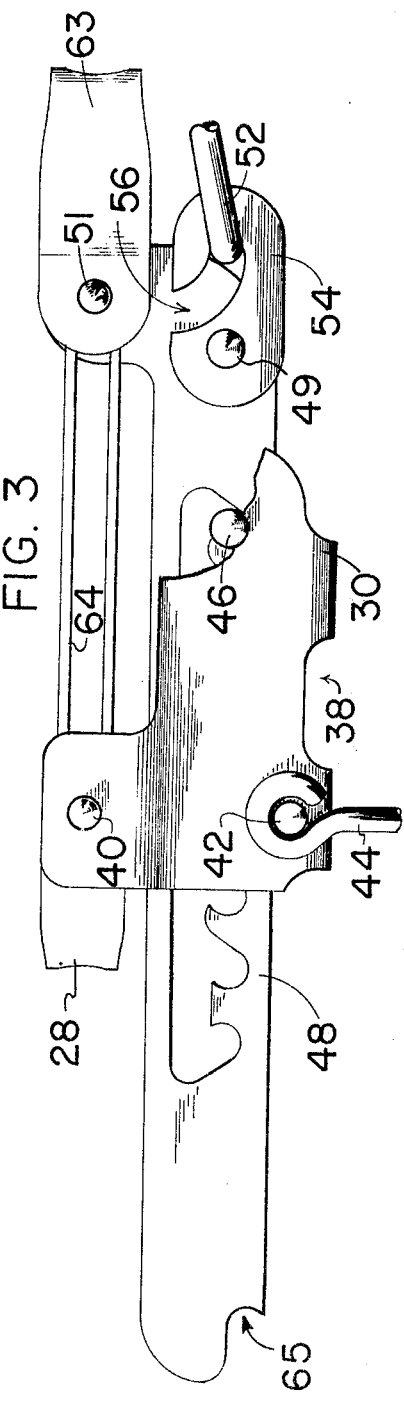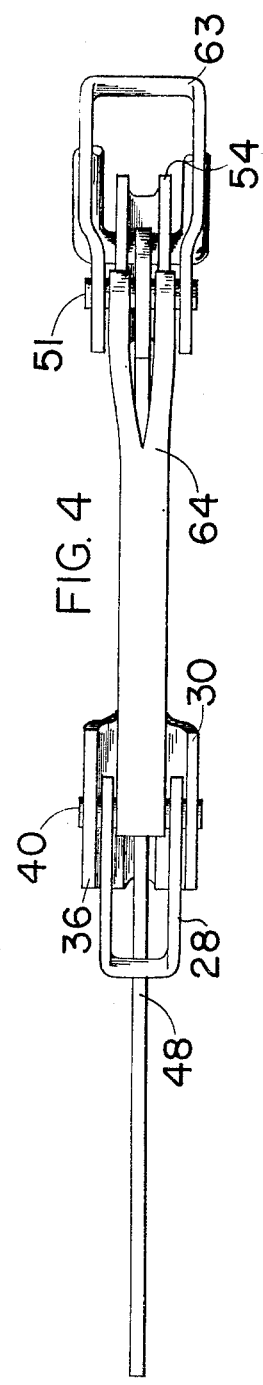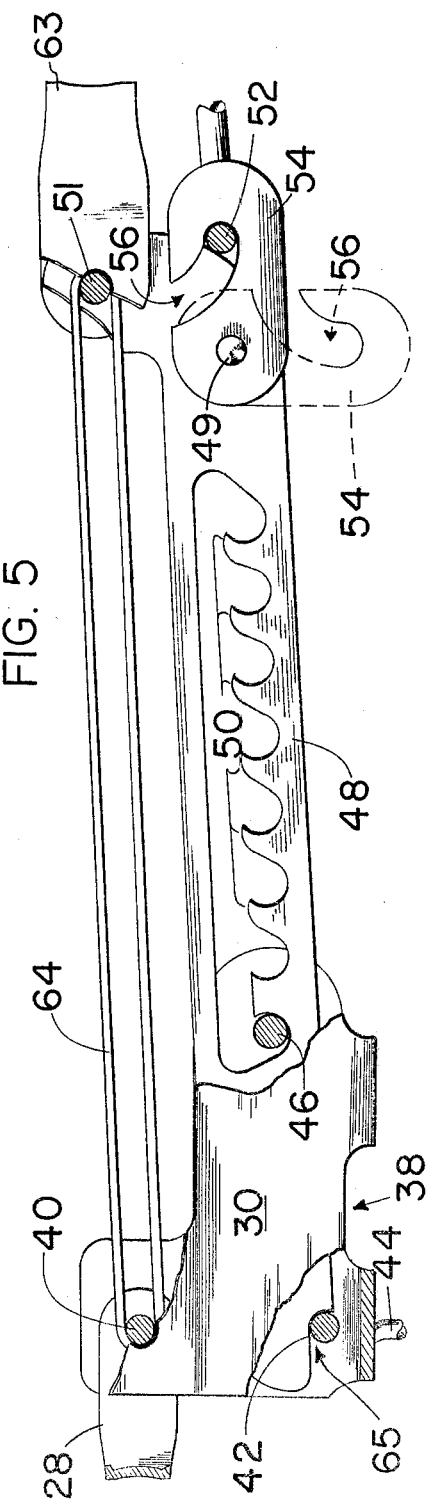

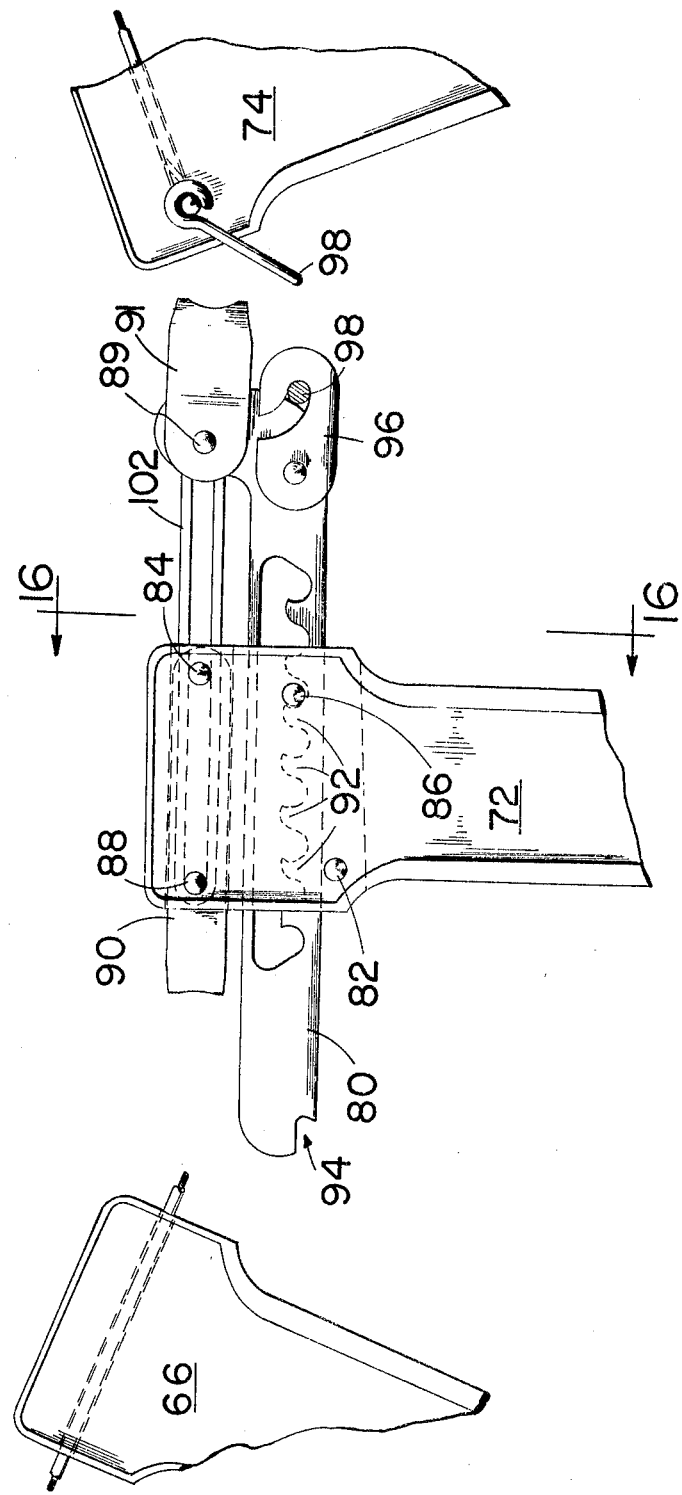

NONSKID TIRE CHAIN CONNECTOR MEANS

BACKGROUND OF THE INVENTION

The present application is a continuation-in-part of copending application, Ser. No. 787,781, Apr. 15, 1977, now U.S. Pat. No. 4,130,155, of which I am a joint inventor and refines, improves, and makes more practical the invention of said copending application.

SUMMARY OF THE INVENTION

An improvement over said copending application is the provision of detachable elastic means and supporting means therefor disposed between the two ends of a side connector of a nonskid tire chain assembly. Another improvement relates to adapting the invention to a nonskid tire assembly comprising tire pads. Another feature relates to link and pin means employed in the side connector wherein a slot in the link extends arcuately inwardly and longitudinally of the link, thus providing a hook when the detachable connection between the ends of the side chain are connected and under tension.

BRIEF DESCRIPTION OF THE DRAWINGS

FIG. 3 is a detached elevational view showing the bar-shaped member, the bar-receiving member and the detachable elastic means in retracted positions;

FIG. 4 is a top plan view of the construction of FIG. 3 and with parts removed;

FIG. 5 is a view similar to FIG. 3 with the parts shown in extended positions;

FIG. 15 is a fragmentary side elevational view, with parts broken away, and on an enlarged scale, illustrating the invention as applied to structure of FIGS. 13 and 14.

DESCRIPTION OF PREFERRED EMBODIMENTS

Figure 1:
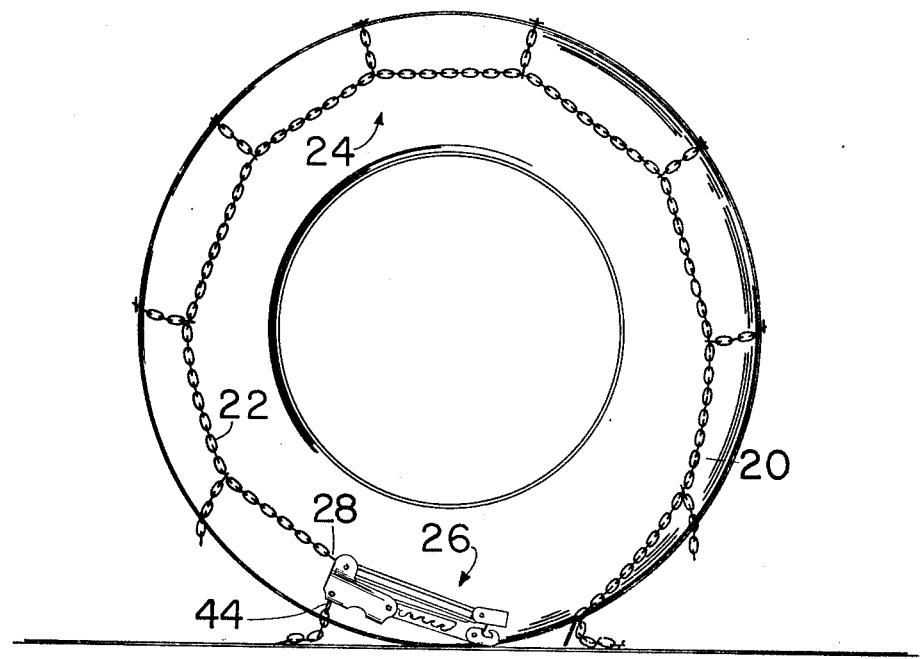
FIG. 1 is a side elevation showing a preferred form of this invention as the parts thereof may appear in extended position relative to each other when being applied to a non-skid tire chain assembly.
Figure 2:
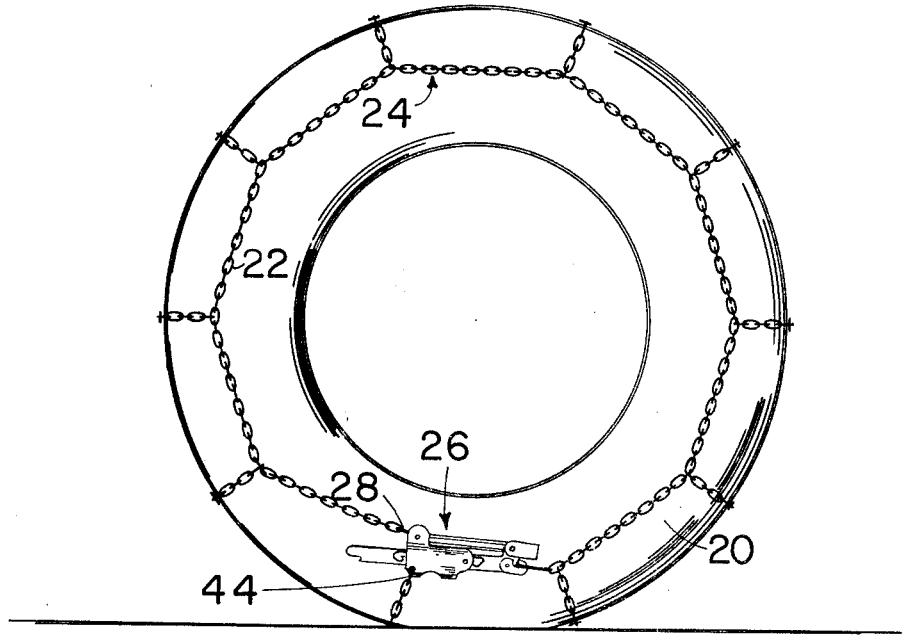
FIG. 2 is a view similar to FIG. 1 but with the connector parts in retracted or applied position relative to each other.

In FIGS. 1 and 2, there is generally illustrated a conventional automobile tire 20, having a side connector 22 of a nonskid tire chain assembly 24 mounted thereon. The two ends of the side connector 22 are shown carrying therebetween a connector (numbered generally 26) of this invention and with the connector 26 shown in extended and nonconnecting relation in FIG. 1 and in connected and retracted position in FIG. 2.

Figure 6:
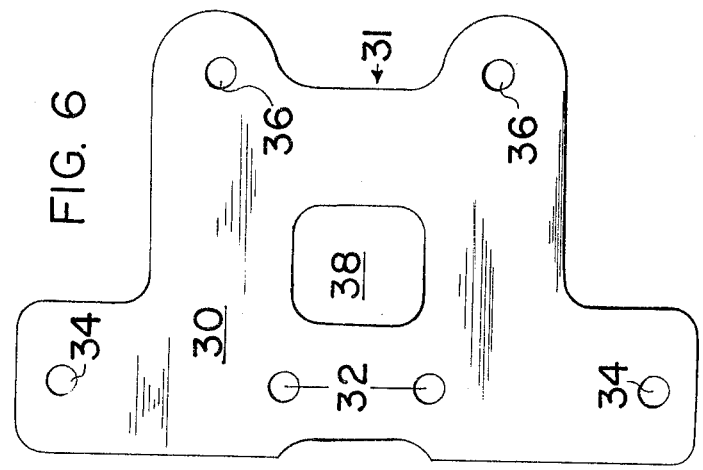
FIG. 6 is a detached plan view of the plate member employed to make the bar-receiving member and before bending.
Figure 7:
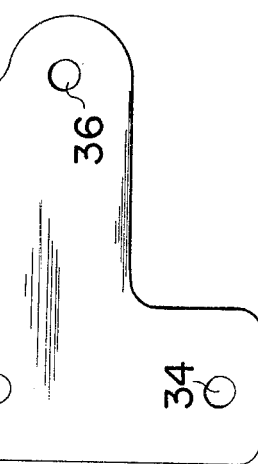
FIG. 7 is a side elevation of the bar-receiving member and after bending.
Figure 8:
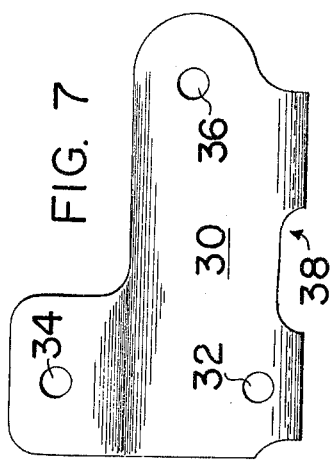
FIG. 8 is an end elevation of the structure of FIG. 7.
Figure 9:
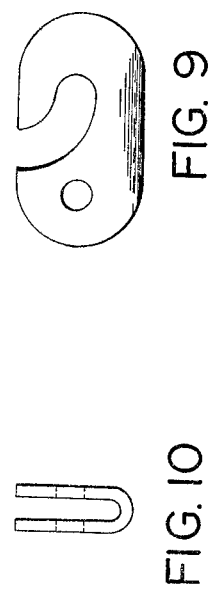
FIG. 9 is the detached side elevation of the hook employed in securing a structure of this invention to an end of a side connector of a nonskid tire chain assembly.
Figure 10:
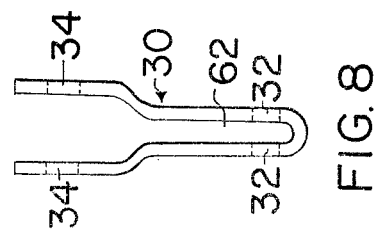
FIG. 10 is an elevational view of the structure of FIG. 9.
Figure 13:
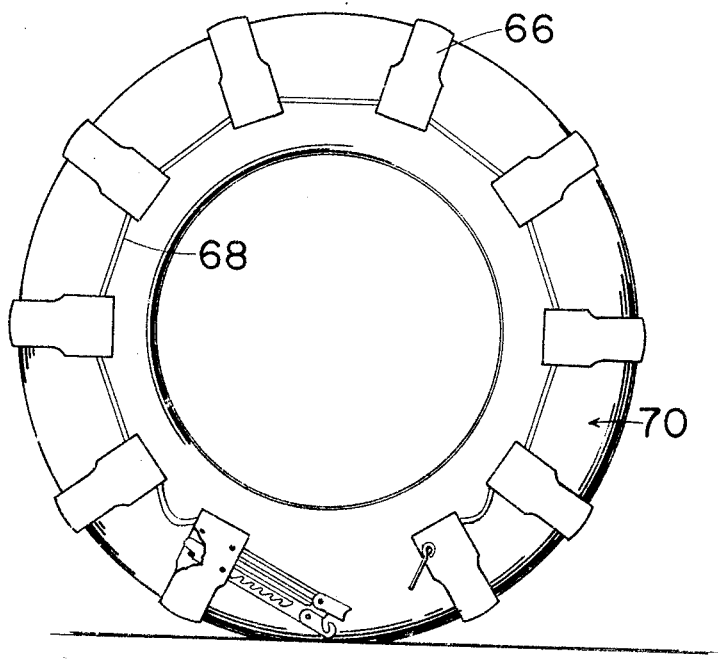
FIG. 13 is a side elevation showing the invention employed in connection with a nonskid chain comprising pads and with the connector mechanism in extended position and just prior to connecting the same to a tire.

Referring particularly to FIGS. 3 to 5, a bar-receiving frame member 30 is shown. The details of this bar-receiving frame member 30 are illustrated in FIGS. 6–8. A single plate 31 (as shown in FIG. 6) is provided with a plurality of pairs of holes 32, 34, 36, and a construction recess 38. When the plate 31 is bent to form a U-shaped member, as shown in FIGS. 7 and 8, the holes of each pair of holes 32, 34, and 36 are aligned to support pins by the complete bar-receiving frame member 30. Transverse bar 40 extends through holes 34 and connects one end of side connector 22 (through clevis 28) with bar-receiving frame member 30. Pin 42 is connected to bar-receiving frame member 30 through holes 32 and cross link 44 (only a fragment being shown in FIGS. 3 and 5) connects with receiving frame member 30 through pin 42. Pin 46 extends crosswise of bar-receiving member 30, is supported in holes 36, and its function will be later described.

Figure 11:
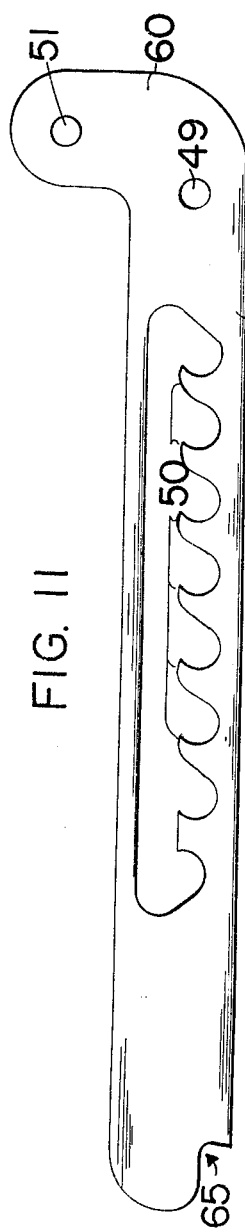
FIG. 11 is a detached side elevational view of the bar-shaped member of substantial length.
Figure 12:
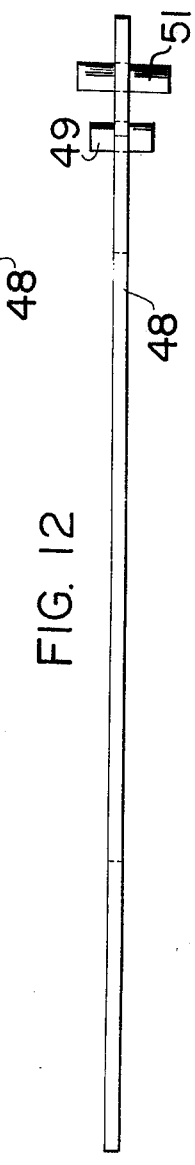
FIG. 12 is a top plan view of the structure of FIG. 11.

A bar-shaped member 48 of substantial length is shown detached in FIGS. 11 and 12 and in operating relation to a frame member 30 in FIGS. 3 and 5. Ratchet means comprising a plurality of teeth carried by one member and a pin carried by another are illustrated by teeth 50 in bar-shaped member 48 and a cross pin 46 carried by frame member 30.

The bar-shaped member 48 is connected with the other end (opposite to end connected to clevis 28) of side connector 22 by a detachable connector or hook comprising a chain link 52 carried by such end of the side connector 22, and a hook 54, the hook 54 being rotatably connected with the bar-shaped member 48 by pin 49 and having a slot 56 therein which slot enters from one side of the hook and extends arcuately inwardly and longitudinally thereof. Thus, with a tension on a side connector 22, the end of link 52 is pulled deeper into slot 56 locking the side connector 22 in place until the tension thereon is relieved. The detachable connector 26 is preferably employed on the inside and outside connectors 22 on each non-skid tire chain assembly for each tire.

The connector 26 of this invention has one end thereof connected to one end of the side connector 22, by clevis 28, and the other end thereof by slot 56 in hook 54 and chain link 52.

Transverse bar 40 is carried by frame member 30 and a second transverse bar 51 is parallel to bar 40 and bar 51 is carried by an offset projection 60 (FIGS. 5 and 11) of bar-shaped member 48. Preferably, the bar member 48 and the projection 60 are one piece and the bar 51 extends crosswise to each side of the bar member 48. The bar-shaped member 48 is slidable in the recess 62 (best shown in FIG. 8) in frame member 30. An elastic band 64 is detachable and extends over bar 40 (carried by frame member 30) and is split to provide two portions—one portion extending over each portion of bar 51—bar 51 being carried by offset projection 60 of bar member 48.

With transverse bars 51 and 40 both offset toward the same side of the center line of the bar portion of the bar-shaped member 48 and that of the frame member 30, the pin 46 (carried by the bar-receiving member 30) enters into locking position with a tooth of teeth 50 (carried by bar-shaped member 48) by reason of the tension of the elastic band 64 urging the transverse bars 40 and 51 toward each other. This position of the parts is best shown in FIG. 3 of the drawings.

When the bars 40 and 51 are both moved arcuately away from each other and downwardly (from the positions shown in FIG. 3) and at the same time tension is applied to separate them and to tension elastic band 64, cross pin 46 may be released from a tooth of teeth 50 and the bar-shaped member 48 and the frame member 30 moved apart relative to each other and to the extended position shown in FIG. 5 of the drawings. Upon allowing the said two members 48 and 30 to relatively turn, the cross pin 46 will engage with a tooth of teeth 50, and the parts will be held by reason of the tension of elastic band 64 and in the extended position of the parts (shown in FIG. 5) and the hook 54 turned to engage with or be disconnected from a link 52 in mounting or removing the nonskid tire chain assembly from a tire 20. Also, when it is desired to stretch band 64 and move the parts toward the position of FIG. 5, the clevises 28 and 63 may be grasped and moved away from each other.

When the parts are in their relative positions as shown in FIGS. 3 and 5, the elastic band 64 tends to turn the members 48 and 30 relative to each other and urges the pin 46 into locking position relative to a tooth of teeth 50. This locks the side connector in a retracted position as shown in FIG. 3 or in an extended position as shown in FIG. 5. Also, in FIG. 5, the notch 65 in the end of the bar-member 48 (removed from the offset projection 60) interlocks with a pin 42 carried by bar-receiving member 30, thus securely locking the parts in the extended position of FIG. 5.

The feature of the present invention in providing two spaced apart transverse bars or pins 40 and 51, respectively, by bar-receiving member 30 and bar-shaped member 48 and a detachable elastic band 64 urging said pins 40 and 51 toward each other, provides for a structure which is economical and practical, both in initial and in maintenance costs.

Referring now to FIGS. 13 to 16, the nonskid tire chain assembly comprises a plurality of traction pads 66 connected with each other by short sections or pieces of link chain 68, the pads 66 and the chain links 68 being used in place of the usual cross links and side chains of the previous figures. Preferably, the pads 66 are formed of "Polyurethane", which is readily obtainable on the market, is strong and durable, is inexpensive, and is readily moldable to desired shapes. The road-contacting surfaces of these pads 66 have the desired nonskid tread and road-engaging surfaces. Also, each of these pads 66 has the desired transverse and longitudinal curvature to fit the tire 70 on which they are mounted. Also, these pads 66 are provided with the usual reinforcing cord members (not shown).

Figure 16:
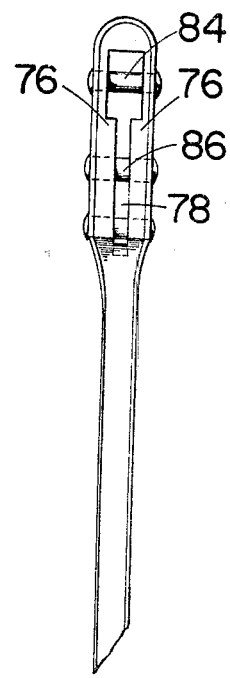
FIG. 16 is a view taken substantially on line 16—16 of FIG. 15 and with parts shown in FIG. 15 removed.
Figure 14:
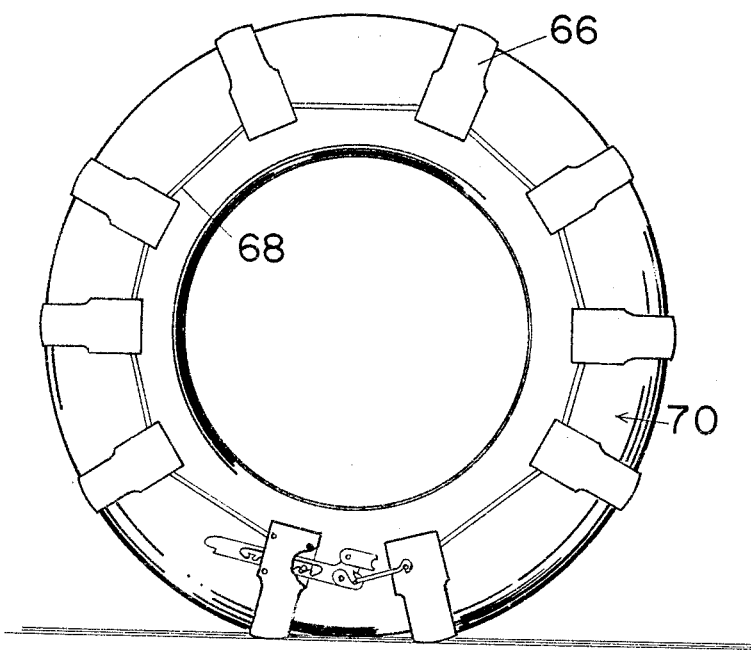
FIG. 14 is a view similar to FIG. 13 but with the connector mechanism in retracted and connected position.

A side connector of the construction of FIGS. 1 through 12 is replaced by a connector shown in FIGS. 13-16 with link chains 68 and pads 66 therebetween and with the end portions of the side connector comprising two spaced apart pad members 72 and 74 in FIGS. 15 and 16. The pad 72 is molded to provide therein a bar-receiving member 76 (FIG. 16) having a slot 78 for slidably receiving therein a bar-shaped member 80 of substantial length. The members 76 and 80 functionally correspond to the members 30 and 48 of the previous figures. The bar-receiving member 76 carries (FIG. 15) pins 82, 84 and 86, and also transverse bar 88, pin 84 functioning merely as a support in bar-receiving member 76. Clevis 90 of link chain 68 connects pad 72 to pad 66. The bar member 80 carries teeth 92 which function the same as teeth 50 of the previous figures. Also, hook 96 is similar to hook 54 of the previous figures and detachably locks the bar member 80 with a link part 98 of the link 68 of FIGS. 13-16. The pin 82 and notch 94 function like the pin 42 and notch 65 of the previous figures in locking bar member 80 and bar-receiving member 76 in extended positions by reason of the action of the elastic band 102 functioning similar to the elastic band 64 of the previous figures. The elastic band 102 is detachably carried by and urges transverse bar 88 (carried by bar-receiving member 76) and transverse bar 89 (carried by bar member 80) toward each other.

The bar member 80 carries teeth 92 and transverse bar 89 which function similarly to parts of FIGS. 1 to 12, i.e., bar member 48 carrying teeth 50 and transverse bar 51. Bar-receiving member 76 has an opening 78 for receiving bar member 80 and also carries the pin 86 for engagement with a tooth of teeth 92 functioning similarly to parts of the FIGS. 1 to 12, bar-receiving member 30, pin 46, and teeth 50. Elastic 102 urges transverse bars 88 and 89 toward each other similarly to that of FIGS. 1-12, i.e., elastic 64 and transverse bars 40 and 51, carried, respectively, by bar-receiving member 30 and bar member 48. Also, hook 96 may be connected with link part 98 (shown in full lines in FIG. 15 and a part in section with hook 96) to connect to connector of this invention to a pad 74. The other end portion of this connector is connectable to pad 66 by clevis 90. An end of bar member 80 is provided with a notch for engagement with pin 82 similar to the operation in FIGS. 1-12 of notch 65 in bar member 48 and pin 42. In order to stretch elastic band 102, the clevises 90 and 91 may be engaged and urged apart similar to that of 28 and 63 of FIGS. 1-12.

SUMMARY

In general, I have provided a self-tightening connector, such as the embodiment of FIGS. 1-12 or the alternative of FIGS. 13-16, for fastening together the two ends of a side connector 22 of FIGS. 1-12 or 68 of FIGS. 13-16 of a nonskid tire chain assembly. A bar-shaped member 48 or 80 of substantial length is provided. This bar-shaped member 48 or 80 slidingly interfits with the bar-receiving member 30 or 76 which limits transverse movement between the two members and permits longitudinal sliding movement therebetween and between extended and retracted positions of the tire chain assembly. Ratchet means are provided by a combination of teeth and a pin, one thereof carried by the bar-shaped member 48 or 80 and the other thereof carried by the bar-receiving member 30 or 76. Next, the detachable elastic means, as elastic band 64 or 102, extends between and is carried by transverse bars 40, 51 or 88, 89. The detachable elastic means yieldingly urges the transverse bars 40, 51, or 88, 89 toward each other and thereby urges the bar-shaped member 48 or 80 and the bar-receiving member 30 or 76 toward retracted position. Also, when the side connector is attached to a tire chain assembly and mounted on a tire, the ratchet means cooperates in locking the bar-receiving member 30 or 76 and the bar member 48 or 80 against relative longitudinal movement toward their extended position. Also, the ratchet means are locked by cooperation between the ratchet means and the elastic means and are released by relative angular movement between the bar member and the bar-receiving member.

Next, a transverse bar, as bar 51, carried by the bar member 48, projects outwardly from each side of the bar member 48 and the elastic means 64 has a portion thereof extending over each portion of the transverse bar 51. Such mode of operation is equally true of transverse bar 89.

The transverse bar 40 or 88, carried by the bar-receiving member 30 or 76, is a cross pin extending across the legs of the bar-receiving member 30 or 76 and an end portion of the elastic band 64 or 102 extends over the transverse bar 40 or 88.

In FIGS. 13 to 16, the nonskid tire chain comprises a plurality of tire pads 66 and the bar-receiving member 76 comprises wall members with a slot 78 therebetween and the same slidably receives bar-shaped member 80. Transverse bar 88 is carried by bar-receiving member 76 and extends between the walls thereof. The bar-shaped member 80 is slidable in a bar-receiving member 76. The transverse bar 88 is a cross pin extending between the walls of the bar-receiving member 76.

The bar-receiving 76 or 30 and the bar member 80 or 48 are interconnected by a detachable connection comprising teeth 92 of FIGS. 13–16 and teeth 50 of FIGS. 1–12 and cross pins, as 86 or 46, one of the teeth and pins being carried by a bar member or a bar-receiving member, as a bar-receiving member 30 and the other being carried by a bar member as bar member 48. Also, a side connector, as side connector 22, and the connector of this invention, as connector 26, employ in their connections a hook, as hook 54, having a slot 56 therein which enters from one side and extends arcuately and inwardly and longitudinally thereof, all of this provides for a lock when the parts are under tension.

Obviously, changes may be made in the forms, dimensions, and arrangement of the parts of this invention without departing from the principle thereof, the above setting forth only preferred embodiments of this invention.

I claim:

1. In a self-tightening connector for fastening together the two ends of a side connector of a nonskid tire chain assembly, a bar-shaped member of substantial length; a bar-receiving member having an opening therein for slidingly interfitting with said bar-shaped member, limiting transverse movement therebetween, and permitting relative longitudinal movement therebetween and between extended and retracted positions; ratchet means comprising engagable teeth and a pin, one thereof carried by the bar-shaped member and the other thereof carried by the bar-receiving member; spaced transverse bars carried, respectively, by said bar-receiving member and said bar-shaped member; detachable elastic means extending between and carried by said transverse bars, yieldingly urging said transverse bars toward each other and thereby said members toward retracted position and, when the side connector is attached to a tire chain and mounted on a tire, cooperating with the ratchet means in locking said two members against relative longitudinal movement toward their extended position, said ratchet means being releasable by relative angular movement of said two members.

2. The combination of claim 1, wherein the transverse bar carried by the bar-shaped member projects outwardly from each side of the bar-shaped member and the elastic means has a portion thereof extending over each projection of the transverse bar carried by the bar-shaped member.

3. The combination of claim 1, wherein the transverse bar carried by the bar-receiving member is a cross pin extending between the legs of the opening in the bar-receiving member and the elastic means has a portion thereof detachably extending over said cross pin.

4. The combination of claim 1, wherein said nonskid tire chain comprises a plurality of tire pads and the bar-receiving member comprises parallel wall members with a slot therebetween, is disposed in one of the tire pads, and slidably receives said bar-shaped member in said slot between its walls.

5. The combination of claim 4, wherein the transverse bar carried by the bar-receiving member is a cross pin extending between the walls of the bar-receiving member.

6. The combination of claim 1, wherein the bar-shaped member and the bar-receiving member are connected between end portions of a side connector of a nonskid tire chain by two connections, one of which is fixed and the other of which is detachable and the detachable connection comprises a pin and a hook, wherein the hook has link means and a slot therein entering from one side of the hook and extends arcuately inwardly and longitudinally thereof, providing a lock when the detachable connection is under tension.

* * * * *